Figure 1:
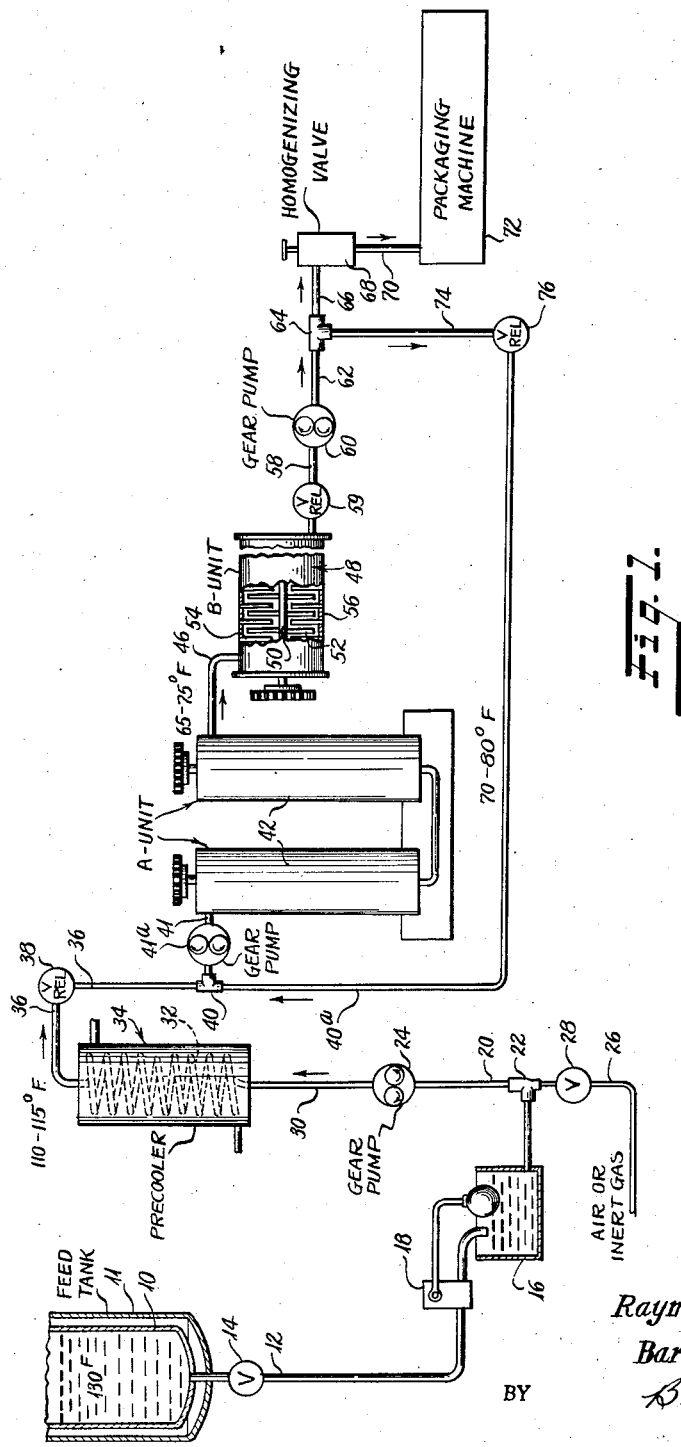

INVENTORS
Raymond J. McGowan
Barton F. Teasdale
BY Bacon & Thomas
ATTORNEYS

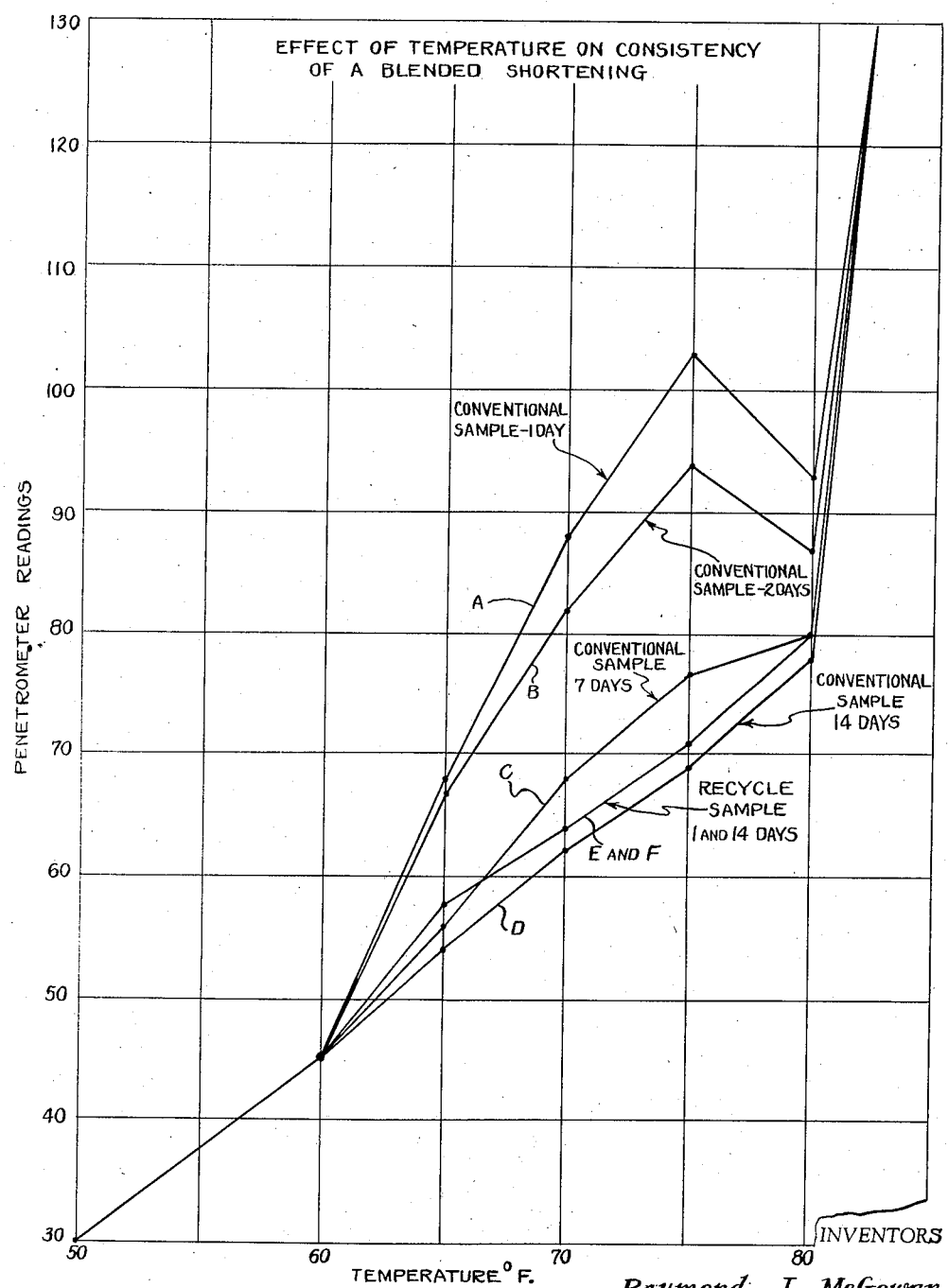

United States Patent Office 2,853,390
Patented Sept. 23, 1958

2,853,390

PROCESS FOR SHORTENING MANUFACTURE

Raymond J. McGowan and Barton F. Teasdale, Toronto, Ontario, Canada, assignors to Canada Packers, Limited, Toronto, Ontario, Canada Application May 7, 1956, Serial No. 583,269

14 Claims. (Cl. 99—122)

This invention relates to a process for the manufacture of shortening, and more particularly to improvements in the solidification of shortening, whereby the solidified product may be immediately packaged and shipped to the consumer within a very short time after packaging.

In the solidification of shortenings, most modern plants use the so-called "Votator" process described by A. E. Bailey in "Industrial Oil & Fat Products," Interscience Publishers, N. Y., 1945, pp. 703–705. In this process, melted fat is fed from storage tanks to a positive-displacement pump and forced under about 300 p. s. i. pressure through the first part of a continuous cooling system. Air, nitrogen, or other inert gas to be incorporated into the product is metered into the suction side of the pump. The liquid fat is first forced through a precooler where its temperature is reduced to slightly above its solidification point, e. g. 110° to 115° F., and is then forced through one or more chilling cylinders known as a "Votator A-Unit." In the Votator A-Unit the temperature is reduced to about 65° to 75° F. Chilling is rapid so that the fat leaves the "A-unit" in a highly supercooled, more or less fluid state. Crystallization has been initiated in the fluid mass since it is nucleated by fine crystals scraped from the walls of the Votator cylinders. The nucleated mass is then passed into unrefrigerated, relatively large hold-up cylinders for further crystallization. These cylinders—usually two in number—known as a "B-unit" are placed in series directly after the A-unit, and are provided with agitators which maintain the contents in a moderate degree of agitation. Crystallization in the B-unit is accompanied by the release of latent heat, which raises the temperature of the product about 15° F., e. g. from about 70° F. to 85° F. If the fat is allowed to crystallize in a quiescent condition, it is of poor texture and is excessively hard, possibly due to fusion of the crystals to form a more or less continuous lattice throughout the fat. The liquid fraction of the fat is bound by the continuous lattice, and such product therefore has little plasticity and offers an undesirably high degree of resistance to penetration and working. When the slurry from the A-unit reaches the B-unit in a suitable state, crystallization has been initiated but has not progressed to any large extent. During the B-unit hold-up time the crystallization is substantially completed while the product is being mechanically worked and formation of a continuous lattice is prevented. However, some crystal latticing in the finished product is considered necessary to give the product the desired body. Theoretically, such latticing could be completely prevented by sufficient working during the B-unit hold-up time, thereby resulting in the formation of single crystals bound by liquid oil. This product would then have attained a maximum plasticity and would be of a soupy or fluid consistency. Accordingly, in the previously existing processes the degree of working to which the shortening is subjected in the B-unit should be carefully controlled to provide a product which, upon subjection to a prolonged tempering period in the package, will attain the desired body and consistency. The shortening leaving the B-unit is picked up by a second gear pump which forces it under 300 to 400 pounds of pressure through a homogenizing valve and a package filler. The packaged shortening is thereafter subjected to a tempering period of at least several days at temperatures of 80° to 85° F. After this tempering period, the shortening has approached its ultimate consistency.

The primary object of this invention is to provide a process for shortening manufacture wherein the finished shortening upon packaging will reach its ultimate consistency within a few hours without having to resort to the normal tempering period. The need for tempering time and space can thereby be largely eliminated, and the product can be shipped to the consumer usually within the next day after packaging.

Another object of the invention is to provide an improved method for controlling crystallization in a process for shortening manufacture whereby a product of a desirable ultimate consistency may be more readily attained.

A further object of the invention is to provide a process for shortening manufacture wherein the finished shortening upon packaging is at approximately room temperature and undergoes relatively little change in temperature or in consistency after packaging.

According to the process of the invention, the feed stream of melted fat, after introduction of air or inert gas and precooling to a temperature just above the crystallization point, and prior to introduction into the Votator A-Unit, is mixed with a recycled stream of mechanically worked and crystallized product from the B-unit whereby the temperature of the feed stream is reduced below its seeding point, and the stream is nucleated by a large number of fine mechanically-strong crystals. The blended stream is then passed through the Votator A-Unit wherein the oil is supercooled only slightly since crystallization has been partially completed before reaching this unit. The slurry leaves the A-unit at approximately 70° to 75° F., as in the conventional process, however there is less latent heat in the slurry since crystallization at this point has been more nearly completed. The slurry is introduced into the B-unit wherein crystallization is substantially completed, but the temperature rise in the product, due to the release of latent heat in this unit, is small, usually less than about 5° F. A portion of the stream from the B-unit is then forced through a homogenizing valve and package filler, and another portion of the stream from the B-unit is diverted back to provide the recycle stream for admixture with the feed stream prior to introduction into the Votator A-Unit. The packaged product reaches its ultimate consistency in an extremely short time because stable, mechanically strong crystals have been initially formed. In most instances, the ultimate consistency is reached within a period of about six hours.

The invention will be further described by reference to the accompanying drawings, in which:

Figure 1 is a diagrammatic representation of the improved system for the manufacture of shortening; and Fig. 2 is a graph providing a comparison of the consistency of blended shortenings made by the conventional process and by the process of the present invention over a two-week period at different temperatures.

Referring now more specifically to Figure 1 of the drawings, a feed tank 10 is provided for melted fat which is held at a temperature of about 130° F. by means of a heat exchange fluid introduced into jacket 11. Crystallization in the feed tank is avoided, since it will result in formation of coarse crystals which impart a poor texture to the finished product. The feed tank 10 is connected to the upper end of a conduit 12 having a valve 14 interposed therein. The lower end of the conduit 12 communicates with a receptacle 16, and gravity flow of the melted fat through the conduit 12 and valve 14 to the receptacle 16 is controlled by a conventional float valve 18.

The receptacle 16 is connected by means of conduit 20 and T-connector 22 to the suction side of a gear pump 24. The T-connector is also connected to one end of a pipe 26 having its other end connected with a source of air or an inert gas (nitrogen, carbon dioxide, etc.) under pressure. A needle valve 28 is interposed in the pipe 26 to control the flow of the selected gas therethrough.

The melted fat admixed with air or a selected inert gas is drawn into the pump 24 and is discharged therefrom under about 300 pounds pressure through a pipe 30 into the coil 32 of a conventional coil-type precooler 34. The cooler 34 reduces the temperature of the melted fat to 100–115° F. and the fat is then fed through the conduit 36, having a relief valve 38 interposed therein to one side of a T-connector 40 where it meets a stream of recycled crystallized material introduced from conduit 40a into the other side of the T-connector 40. The combined streams pass from the outlet of the T-connector 40 into the suction side of pump 41a and then through pipe 41 into a conventional "Votator" type rapid chilling unit 42 designated as an "A-unit." The temperature of the mixture of the gas and melted fat is reduced upon meeting the recycle stream, and the combined stream now contains a relatively large proportion of fine but fully developed crystals. The crystal slurry passes through the thin-walled nickel tubes of the Votator "A-Unit" where it is thoroughly mixed and chilled, the thin-walled nickel tubes being surrounded by a medium of evaporating liquid ammonia.

The chilled stream, containing a portion of supercooled oil mixed with crystals is discharged from the A-unit as a slurry at 65–75° F., and passes through conduit 46 into an unrefrigerated cylinder 48, hereinafter called the "B-unit," for substantial completion of crystallization. The B-unit is equipped with a driven shaft 50 rotatably supported therein and having a plurality of radially extending agitator rods 52 mounted thereon. The rods 52 are helically spaced axially of the shaft 50 and are adapted to intermesh with similarly arranged stationary rods 54 fixedly secured to the inner side of the cylindrical wall 56. The B-unit is not jacketed or cooled. Its function is merely to maintain the fat in a state of uniform agitation while crystallization proceeds.

The material leaving the B-unit is extruded through a conduit 58 having a relief valve 59 interposed therein, and is picked up by the suction side of another gear pump 60 which discharges it under about 400 pounds pressure through conduit 62 to one side of a T-connector 64. A portion of the effluent stream passes through the T-connector 64 and through conduit 66 into a homogenizing valve 68. The homogenized product is conducted from the discharge side of the valve 68 through conduit 70 into a conventional packaging machine 72.

According to the present invention, a part of the extrusion stream leaving the B-unit is diverted through conduit 74 and relief valve 76, and is returned to the precooled feed stream through conduit 40a and T-connector 40 for recycling through the described apparatus. The lower-melting crystals in the extrusion stream melt on contact with the warm feed stream to reduce the temperature of the feed stream entering the A-unit below its seeding point, and the stream at this point is nucleated by the fine, but well-formed crystals. The temperature of the precooled oil stream may be reduced by about 10 to 20° F. by mixing with the recycled stream of crystallized material. For example, the temperature of a precooled oil stream at 110° F. may be reduced to about 90° to 100° F., depending on the quantity of recycled material.

The addition of the recycled extrusion stream from the B-unit to the feed stream supercools the feed stream only slightly, and stable, mechanically strong crystals are formed during the subsequent chilling and crystallization period. The amount of crystalline material present at the point of introduction of the material into the A-unit will depend upon the proportion of the extrusion stream recycled and the temperature of the feed stream. The latter may be held constant by means of precooler 34, and the proportion of recycle may be controlled by the setting of relief valve 76. While the proportion of recycled material may be varied considerably depending on the starting ingredients of the particular shortening and upon other process conditions, it, in general, will constitute about 20 to 60% of the total extrusion stream from the B-unit.

Since cooling and crystallization are partially completed before reaching the A-unit, there is less oil to supercool in the A-unit than in the conventional process, and although the slurry leaving the A-unit is at approximately the same temperature (65–75° F.) as the slurry in the conventional process, there is considerably less latent heat to be removed in the B-unit. The temperature rise in this unit due to the release of latent heat is usually less than 5° F., and the product is packaged at substantially ambient temperature.

In the conventional process, when the slurry from the A-unit reaches the B-unit crystallization has been initiated but has not progressed to any large extent. During the B-unit hold-up time, the crystallization is substantially completed while the product is being mechanically worked and the formation of a continuous lattice is prevented. The degree of working to which the shortening is subjected in the B-unit is dependent upon the nature of the shortening, the degree of refrigeration, and the rate of flow and subsequent hold-up time in the fixed length of the B-unit. The condition of the slurry reaching the B-unit is also of great importance and depends upon the factors related above. A heavy slurry may have latticing well established and cannot be worked efficiently, while, on the other hand, a very light slurry may not have its crystallization sufficiently completed before leaving the B-unit and consequently, heavy latticing may occur while the shortening cools in a quiescent state in the package. It is also possible that a shortening may enter the B-unit as a light slurry and crystallize completely before the working is finished. It may, therefore, be overworked to such an extent that it sets very slowly. By the process of the present invention, the recycling of a portion of the substantially completely crystallized material from the B-unit provides a convenient process control feature whereby the other features of the process become less critical. Thus, by simply increasing or decreasing the proportion of recycle material, a product stream of desirable consistency can be rapidly obtained without readjustment of chilling rates, hold-up times, etc., for variations in the feed stream.

In the conventional process, when the shortening is supercooled in the A-unit, a high percentage of unstable, mechanically weak crystals are formed. These crystals change, in time, to stable, mechanically stronger crystals which strengthen the lattice bonding and produce the ultimate set in the shortening. However, the conversion of the unstable crystals is a comparatively slow process, and, in the practicing of the conventional method may require weeks or possibly months. As a consequence of this time delay, much storage space is required to permit the shortening to reach its ultimate state of consistency and this factor involves a substantial portion of the manufacturing costs. Moreover, crystal latticing in the package is dependent upon the temperature of the ambient atmosphere, and as the temperature is lowered from the initial packaging temperature of 85–90° F. more crystallization, and hence more latticing, occurs. Since shortening is, in itself, a good heat insulator, the cooling process or tempering period and attainment of ambient temperature may require several days, especially for shortenings packaged in drums. By the present invention, the time required to bring the packaged or drum product to a uniform normal room temperature of 70°–75° F., accepted as the optimum temperature for use, is substantially eliminated, and there is very little consistency change after the first several hours, so that the product can be shipped to the consumer within twenty-four hours of its manufacture. Considerable savings in manufacturing costs are thereby effected.

In order to further illustrate the importance of the recycle process of this invention in obtaining a product of uniform consistency substantially immediately after packaging, reference is made to Fig. 2 of the drawings. A blended shortening was produced by a conventional process utilizing apparatus as illustrated in Fig. 1, but without employing any recycle. Portions of this shortening were packaged and stored at various temperatures over a range of from 50° to 85° F. Penetrometer tests were conducted after storage periods of one day, two days, seven days, and fourteen days. Samples of blended shortening utilizing the same starting ingredients, but finished by the recycle process of the invention were stored under the same temperature conditions and then tested after periods of one day and fourteen days. Curve A represents the conventional sample after one day's storage; curve B, after two days' storage; curve C, after seven days' storage; and curve D, after fourteen days' storage. It will be seen that over the temperature range of from 60° F. to 80° F. these curves are quite widely spaced. For example, at 75° F., which would be approximately normal room temperature, the penetrometer reading of the sample after one day's storage was approximately 103, after two days' storage was approximately 94, after seven days' storage was approximately 77, and at the end of fourteen days' storage was about 68, indicating that at least two weeks were required for stabilizing this sample. On the other hand, curves E and F, representing the product of the recycle process after storage periods of one and fourteen days respectively, are substantially coincidental throughout the entire temperature range over which samples of the product were storaged, clearly indicating that these samples had reached a uniform consistency at the end of one day's storage at each of the storage tempeartures involved. As may be observed by comparing curves E and F with curve D, the penetrometer reading over the entire range of storage temperatures for the samples made by the recycle process after both one and fourteen days' storage were fairly close to the readings obtained on the conventional sample after the end of fourteen days.

The consistency measurements of the samples of shortening were made with a penetrometer manufactured by the Precision Scientific Company. This apparatus comprises a weight in the shape of a cone which is placed at rest on the surface of the shortening. A spring holding the cone in place is released, and the cone penetrates into the shortening. The amount of penetration in a given time period is recorded on a dial, and registers in units of one-tenth millimeter.

The invention is further illustrated by the following samples of practice:

*Example I*

A shortening blend was prepared from the following ingredients:

20% Fish oil hydrogenated to a Wiley M. P. of 37–38° C.
30% Edible tallow hydrogenated to a Wiley M. P. of 46–48° C.
25% Soya oil hydrogenated to a Wiley M. P. of 29–31° C.
5% Stearine hydrogenated to a Wiley M. P. of 60° C.
20% Palm oil (natural) 38–42° C.

This shortening was processed by the novel recycle process of the invention under the following conditions:

Temperatures:
   Feed stream _____ ° F__ 107
   Feed to A-unit _____ ° F__ 93
   A-unit slurry _____ ° F__ 75
   Extrusion stream _____ ° F__ 75

Pressures:
   Extrusion _____ lb. p. s. i__ 400
   Internal _____ lb. p. s. i__ 250
   Ammonia back pressure on chilling unit
                                                   lb. p. s. i__ 25

The proportion of extrusion stream recycled to the feed stream was 44%. The change in consistency of the product was determined by penetrometer readings as follows:

| Post Run-Off Time (hours) | Temperature (° F.) | Penetrometer |
|---|---|---|
| ½ | 79 | 124 |
| 1 | 79 | 117 |
| 2 | 78 | 110 |
| 4 | 78 | 102 |
| 6 | 79 | 94 |
| 24 | 76 | 92 |
| 96 | 83 | 97 |
| 170 | 79 | 90 |

It will be observed that the shortening produced by the recycle process reached its ultimate consistency within six hours of run-off.

*Example II*

A blended shortening utilizing the same starting ingredients as in Example I and substantially the same process conditions except as affected by the recycled material was processed by the conventional process. The change in consistency of the product over a two-week period was determined by penetrometer tests as follows:

| Post Run-Off Time (hours) | Temperature (° F.) | Penetrometer |
|---|---|---|
| ½ | 81 | 220 |
| 1 | 78 | 197 |
| 2 | 74 | 190 |
| 4 | 71 | 160 |
| 6 | 69 | 148 |
| 24 | 68 | 116 |
| 48 | 67 | 104 |
| 72 | 68 | 110 |
| 168 | 77 | 84 |
| 336 | 77 | 66 |

This shortening was not subjected to any tempering treatment, other than variations in room temperature. It will be observed that the shortening was undergoing consistency changes for at least seven days after run-off.

*Example III*

A blended shortening of the same formula was processed by the recycle process under substantially the same conditions as in Example I, except that the hold-up time in the system was increased to allow more crystallization to take place, and the percentage of recycle was reduced to 24%. The following penetrometer readings were observed:

| Post Run-Off Time (hours) | Temperature (° F.) | Penetrometer |
|---|---|---|
| ½ | 79 | 70 |
| 1 | 77 | 55 |
| 3 days | 71 | 52 |
| 5 days | 71 | 51 |
| 7 days | 72 | 52 |
| 10 days | 73.5 | 53 |
| 21 days | 72 | 52 |

Ultimate product consistency was obtained substantially at the end of one hour.

Example IV

The same batch as in Example III was again run by the recycle process using exactly the same process conditions and recycle percentage, except that the hold-up time in the system was doubled to allow still more crystallization to take place. The following penetrometer readings were observed:

| Post Run-Off Time (hours) | Temperature (° F.) | Penetrometer |
|---|---|---|
| ¼ | 81 | 50 |
| 24 | 72 | 50 |

It will be observed that ultimate consistency was almost immediately attained.

Example V

A hydrogenated vegetable oil product was processed by the recycle process, under the following conditions:

Temperatures:
    Feed stream _____ ° F__ 108
    Feed to A-unit _____ ° F__ 96
    A-unit slurry _____ ° F__ 73
    Extrusion _____ ° F__ 76

Pressures:
    Extrusion _____ p. s. i__ 450
    Internal _____ p. s. i__ 250
    Ammonia back pressure on A-unit _____ p. s. i__ 25

Percent recycle _____ 54.5

The starting ingredients for this product consisted of 70% cottonseed oil and 30% soya bean oil hydrogenated together to a Wiley M. P. of 45° C. The following penetrometer readings on the finished product were recorded:

| Post Run-Off Time (hours) | Temperature (° F.) | Penetrometer |
|---|---|---|
| 1 | 76 | 123 |
| 2 | 69 | 97 |
| 4 | 73 | 100 |
| 24 | 72 | 54 |
| 72 | 74 | 50 |
| 144 | 73.5 | 47 |
| 196 | 74 | 50 |

Ultimate product consistency was attained within one day.

Example VI

A blended shortening was prepared from the following ingredients:

40% Fish oil hydrogenated to a Wiley M. P. of 37-38° C.
20% Edible tallow hydrogenated to a Wiley M. P. of 46-48° C.
35% Soya oil hydrogenated to a Wiley M. P. of 29-31° C.
5% Stearine hydrogenated to a Wiley M. P. of 60° C.

This shortening was processed by the recycle process on plant scale and under the following conditions:

Temperatures:
    Feed tank _____ ° F__ 129
    Precooled oil _____ ° F__ 109
    Feed to A-unit _____ ° F__ 91
    Extrusion stream _____ ° F__ 75
    Package temp _____ ° F__ 78

Pressures:
    Extrusion _____ p. s. i__ 350
    Internal _____ p. s. i__ 350
    Ammonia back pressure on chilling unit _ p. s. i__ 8

Flow rate _____ lbs./hour __ 11,000

Percent recycle _____ 53

The following penetrometer readings on the finished product were recorded:

| Post Run-Off Time (hours) | Temperature (° F.) | Penetrometer |
|---|---|---|
| 1 | 78 | 130 |
| 2 | 77 | 125 |
| 3 | 77 | 110 |
| 4 | 78 | 106 |
| 5 | 75 | 97 |
| 6 | 73 | 87 |
| 8 | 70 | 80 |
| 19 | 75 | 80 |
| 23 | 76 | 82 |
| 43 | 75 | 82 |
| 48 | 76 | 85 |
| 120 | 77 | 85 |
| 140 | 76 | 82 |

It is observed that the shortening reached its ultimate consistency within six hours.

Example VII

A shortening of the same formula as that of Example VI was processed by the conventional method under the following conditions:

Temperatures:
    Feed tank _____ ° F__ 130
    Precooled oil _____ ° F__ 114
    A-unit slurry _____ ° F__ 74
    Extrusion stream _____ ° F__ 86
    Package _____ ° F__ 88

Pressures:
    Extrusion _____ p. s. i__ 350
    Internal _____ p. s. i__ 250
    Ammonia back pressure on chilling unit _ p. s. i__ 15

Flow rate _____ lbs./hour __ 11,000

Penetrometer readings were recorded as follows:

| Post Run-Off Time (hours) | Temperature (° F.) | Penetrometer |
|---|---|---|
| 1½ | 80 | 260 |
| 6½ | 76 | 210 |
| 9 | 80 | 160 |
| 24 | 75 | 110 |
| 48 | 75 | 103 |
| 120 | 77 | 93 |
| 144 | 76 | 85 |

The ultimate consistency of the product was not reached until after at least six days.

Example VIII

A blended shortening of the same formula of Example VI was processed by the recycle process on plant scale and under the following conditions:

Temperatures:
    Feed tank _____ ° F__ 122
    Precooled oil _____ ° F__ 107
    Feed stream to A-unit _____ ° F__ 98
    A-unit slurry _____ ° F__ 70
    Extrusion stream _____ ° F__ 76
    Package _____ ° F__ 81

Pressures:
    Extrusion _____ p. s. i__ 350
    Internal _____ p. s. i__ 350
    Ammonia back pressure on chilling unit _ p. s. i__ 15

Flow rate _____ lbs./hr __ 11,000

Percent recycle _____ 30

Penetrometer readings were recorded as follows:

| Post Run-Off Time (hours) | Temperature (° F.) | Penetrometer |
|---|---|---|
| 1 | 81 | 126 |
| 2½ | 80 | 105 |
| 4 | 78 | 85 |
| 5 | 77 | 75 |
| 10 | 72 | 72 |
| 28 | 74 | 70 |
| 43 | 77 | 75 |
| 140 | 77 | 80 |
| 360 | 75 | 75 |

Ultimate consistency was attained in about five hours after packaging. Shortening of the same formula processed by the conventional method underwent consistency changes for over a week after packaging.

Example IX

A blended shortening having the same formula as in Example VI was processed by the recycle process on plant scale and under the following conditions:

Temperatures:
- Feed tank _____ ° F__ 106
- Precooled oil _____ ° F__ 96.5
- Feed to A-unit _____ ° F__ 86.0
- A-unit slurry _____ ° F__ 67.0
- Extrusion stream _____ ° F__ 73.5
- Package _____ ° F__ 76.0

Pressures:
- Extrusion _____ p. s. i__ 350
- Internal _____ p. s. i__ 350
- Ammonia back pressure on chilling unit _____ p. s. i__ 13

Flow rate _____ lbs./hr__ 10,000
Percent recycle _____ 41

Penetrometer readings were recorded as follows:

| Post Run-Off Time (hours) | Temperature (° F.) | Penetrometer |
|---|---|---|
| 0.5 | 77 | 190 |
| 1.5 | 77 | 140 |
| 4.5 | 76 | 140 |
| 18 | 76 | 95 |
| 43 | 75 | 80 |
| 136 | 77 | 80 |

Shortening having the same formula processed by the conventional process without recycle required over twice the time to reach approximately the same ultimate consistency.

Example X

A shortening was produced by the conventional process without recycle and was tempered for two months. The tempered product had a penetrometer reading of 70 at 72° F. The starting ingredients for this product were as follows:

48% Palm oil, Wiley M. P. of_____ 38–41° C.
18% Soya oil hydrogenated to a Wiley M. P. of 27–38° C.
30% Soya oil hydrogenated to a Wiley M. P. of 29–31° C.
4% Stearine hydrogenated to a Wiley M. P. of 60° C.

The product was melted and reprocessed by the recycle process of the invention under the following conditions:

Temperatures:
- Feed stream _____ ° F__ 106
- A-unit feed _____ ° F__ 90
- A-unit exit _____ ° F__ 63
- Extrusion _____ ° F__ 70
- Package _____ ° F__ 75

Pressures:
- Internal _____ p. s. i__ 250
- Extrusion _____ p. s. i__ 400
- Ammonia back pressure on chilling unit _____ p. s. i__ 25

Percent recycle _____ 44

Penetrometer readings were recorded as follows:

| Post Run-Off Time (hours) | Temperature (° F.) | Penetrometer |
|---|---|---|
| 1 hour | 73 | 75 |
| 5 hours | 73 | 75 |
| 1 day | 76 | 65 |
| 2 days | 76 | 65 |
| 5 days | 78 | 75 |
| 7 days | 76 | 75 |

From the foregoing description and examples, it will be apparent that the process of the invention has provided an improvement in the manufacture of shortening whereby process control is facilitated, and tempering and cooling periods after processing are virtually eliminated, thereby materially reducing the necessary plant storage requirements prior to shipment.

We claim:

1. A continuous process for the manufacture of an all-fat plastic shortening comprising blending a feed stream consisting essentially of melted fat with a recycled stream of fat containing finely-divided mechanically strong crystals so that the temperature of the feed stream is reduced below the seeding point and the feed stream is nucleated with at least a portion of said crystals, subjecting the stream of blended fat to rapid chilling to provide a slurry containing a supercooled liquid fat faction, subjecting said slurry to crystallization and mechanical working to provide a product stream in which crystallization has been substantially completed, withdrawing a portion of said product stream, recycling another portion of said product stream for blending with said feed stream of melted fat, and tempering the material of the product stream to ultimate consistency in a period of time less than about one day.

2. The process as defined in claim 1, wherein said feed stream of melted fat is at a temperature just above its crystallization temperature and the temperature thereof is lowered by about 10 to 20° F. by blending with said recycled stream.

3. The process as defined in claim 1, wherein the recycled portion of crystallized material comprises about 20 to 60% of the total product stream.

4. The process as defined in claim 1, wherein the withdrawn portion of the product stream is homogenized and packaged.

5. The process as defined in claim 1, wherein the fat comprising the feed stream is derived from vegetable sources.

6. The process as defined in claim 1, wherein the fat comprising the feed stream is derived from a blend of ingredients from vegetable and animal sources.

7. The process as defined in claim 1, wherein the fat comprising the feed stream includes a fatty material from marine sources.

8. A process for the manufacture of an all-fat plastic shortening, comprising: precooling a stream consisting esesntially of melted fat to a temperature just above the crystallization temperature, blending the precooled stream with a recycled stream of fat which has been subjected to crystallization and mechanical working, subjecting the blended stream to rapid chilling to provide a slurry containing a supercooled liquid fraction, subjecting said slurry to mechanical working and crystallization, homogenizing a portion of said mechanically worked and crystallized mass, tempering the homogenized product to substantially ultimate consistency in a period of less than about one day, and recycling another portion of said mechanically worked and crystallized mass for blending with the precooled feed stream.

9. A continuous process for the manufacture of all-fat plastic shortening, comprising precooling a stream consisting essentially of melted fat to a temperature just above the crystallization temperature, blending the precooled stream with a recycled stream of fat which has been subjected to crystallization and mechanical working so that the temperature of the feed stream is reduced to about 90° F. to 100° F. and is nucleated with fine mechanically strong crystals, subjecting the blended stream to rapid chilling to a temperature of about 65° to 75° F., subjecting the resultant chilled material to crystallization and mechanical working to provide a product stream in which crystallization is substantially completed, homogenizing and packaging a portion of said product stream, tempering said packaged portion to ultimate consistency in a period of less than about one day, and recycling another portion of said product stream for blending with said stream of melted fat.

10. The process as defined in claim 9, wherein the temperature of the precooled melted fat stream is about 100° F. to 115° F.

11. The process as defined in claim 9, wherein a gas is incorporated in said melted fat prior to precooling.

12. The process as defined in claim 9, wherein the portion of recycled material comprises about 20% to 60% of the total product stream.

13. The process as defined in claim 9, wherein the proportion of recycled product stream and the hold-up period during crystallization and mechanical working are correlated to provide a product stream having a temperature of about 70° to 80° F.

14. A continuous process for manufacture of all-fat plastic shortening, comprising: melting a blend of fatty material to provide a stream consisting essentially of liquid fat; injecting a gas into said stream of liquid fat; precooling the resultant feed stream to a temperature just above the crystallization point of the fatty materials; blending said feed stream of liquid fat with a recycled stream of fatty material, which has been subjected to crystallization while undergoing mechanical working, to reduce the temperature of said feed stream below its seeding temperature and nucleate said feed stream with finely-divided well-formed crystals; subjecting the resultant blended stream to rapid chilling to reduce the temperature to about 65° to 75° F.; subjecting the resultant chilled stream to crystallization and mechanical working to provide a product stream of substantially completely crystallized fat having a temperature of about 70° to 80° F.; homogenizing and packaging a portion of said product stream to provide a packaged product which substantially reaches its ultimate consistency within about six hours; and recycling another portion of said product stream for blending with said stream of melted fat.

References Cited in the file of this patent

UNITED STATES PATENTS

| 2,592,224 | Wilson et al. | Apr. 8, 1952 |
| 2,745,750 | Shafer et al. | May 15, 1956 |

OTHER REFERENCES

"Cottonseed" by Bailey (Interscience Publishers, New York, 1948), pages 727 to 729.

Abstract of Hormel et al., application Serial No. 606,170, published June 26, 1951, 647 O. G. 1278.